United States Patent
Sauttreau et al.

(10) Patent No.: US 9,908,965 B2
(45) Date of Patent: Mar. 6, 2018

(54) FIRE-BREAK CAULKING AND FILLING DEVICE

(75) Inventors: Jean Sauttreau, Saint Martin de Valgalgues (FR); Laurent Bergogne, Nimes (FR)

(73) Assignees: IFP ENERGIES NOUVELLES, Rueil-Malmaison (FR); COMPART SAS, Ales (FR)

( * ) Notice: Subject to any disclaimer, the term of this patent is extended or adjusted under 35 U.S.C. 154(b) by 427 days.

(21) Appl. No.: 12/934,683

(22) PCT Filed: Mar. 27, 2009

(86) PCT No.: PCT/FR2009/000338
§ 371 (c)(1),
(2), (4) Date: Feb. 25, 2011

(87) PCT Pub. No.: WO2009/133261
PCT Pub. Date: Nov. 5, 2009

(65) Prior Publication Data
US 2011/0144222 A1    Jun. 16, 2011

(30) Foreign Application Priority Data
Mar. 28, 2008    (FR) .................................... 08 01710

(51) Int. Cl.
| | |
|---|---|
| *C08G 18/10* | (2006.01) |
| *C09K 21/12* | (2006.01) |
| *C08G 18/08* | (2006.01) |
| *C08K 5/523* | (2006.01) |
| *C08G 101/00* | (2006.01) |
| *C08K 3/38* | (2006.01) |

(52) U.S. Cl.
CPC .............. *C08G 18/10* (2013.01); *C08K 5/523* (2013.01); *C09K 21/12* (2013.01); *C08G 18/14* (2013.01); *C08G 2101/0083* (2013.01); *C08G 2190/00* (2013.01); *C08K 3/38* (2013.01)

(58) Field of Classification Search
CPC ............................ C08G 18/14; C08G 2190/00
USPC .................................................. 521/159, 170
See application file for complete search history.

(56) References Cited

U.S. PATENT DOCUMENTS

| | | | |
|---|---|---|---|
| 5,597,885 A | 1/1997 | Lutter et al. | |
| 5,739,173 A * | 4/1998 | Lutter et al. | ..................... 521/99 |
| 5,981,612 A * | 11/1999 | Keppeler et al. | ............. 521/107 |
| 6,713,522 B2 * | 3/2004 | Zhang et al. | ................. 521/170 |
| 2004/0020148 A1* | 2/2004 | Thompson | ................... 52/309.9 |
| 2007/0094963 A1* | 5/2007 | McDonald et al. | ............ 52/270 |

FOREIGN PATENT DOCUMENTS

| | | |
|---|---|---|
| EP | 0 400 402 A1 | 12/1990 |
| FR | 2 873 300 A1 | 1/2006 |

* cited by examiner

*Primary Examiner* — Melissa A Rioja
(74) *Attorney, Agent, or Firm* — Fitch, Even, Tabin & Flannery, LLP

(57) ABSTRACT

The invention relates to a caulking or filling device having fire-break properties and made of an elastic material comprising polyurethane foam. The foam is obtained by reacting at least one polyol having a molecular weight of 4000 to 7000 g/mol and an OH index of 20 to 40 (mg KOH/g), and an isocyanate in the form of a prepolymer or quasi-prepolymer comprising between 5 and 25% of free NCO functions. The elastic material comprises at least 50 wt % of flame-retarding agents. The invention also relates to the use of the device for making seals or fillings having fire-stopping characteristics.

20 Claims, 4 Drawing Sheets

E

FIRE-BREAK CAULKING AND FILLING DEVICE

The domain of the present invention concerns passive protection against fires, and in particular means of fire-break caulking and/or filling, in particular for use as means of partition, such as expansion seals or panels.

Partition or expansion seals are placed between concrete or masonry slabs or shells (walls). These seals are produced by placing a polystyrene type plastic plate or board when concrete is poured, which is then removed, once the construction is dry. In the space left empty due to removal of the polystyrene, or the filling materials, seals with break-fire properties are inserted.

These seals may be of varying sizes, static (partition) or dynamic (expansion J seals). FIG. 1a to 1e show different conventional configurations:

1a: Linear J seal in a horizontal construction
1b: Linear vertical J seal in a vertical construction
1c: Linear horizontal J seal in a vertical construction
1d: Horizontal J seal for a wall abutting against a floor or a ceiling
1e: horizontal J seal of a floor abutting against a wall.

Figure 1A:
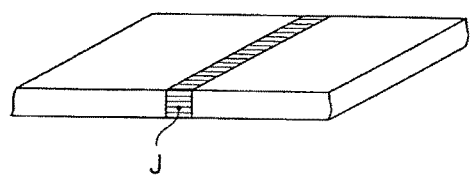
Figure 1D:
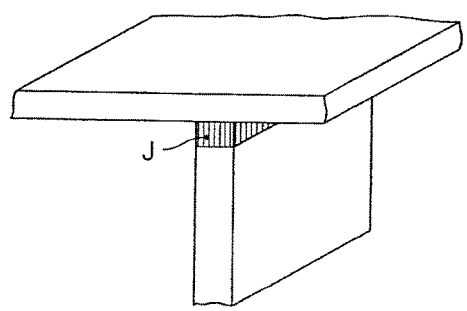
Figure 1B:
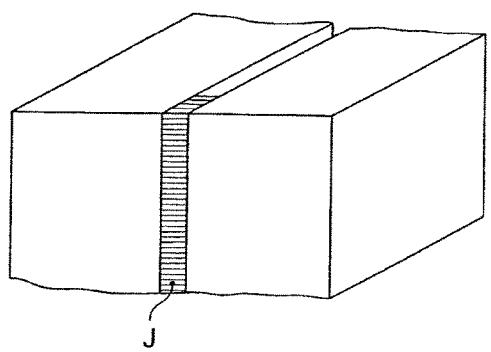
Figure 1E:
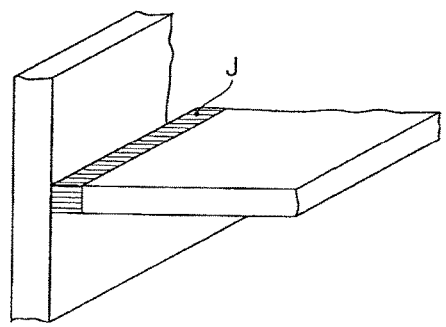
Figure 1C:
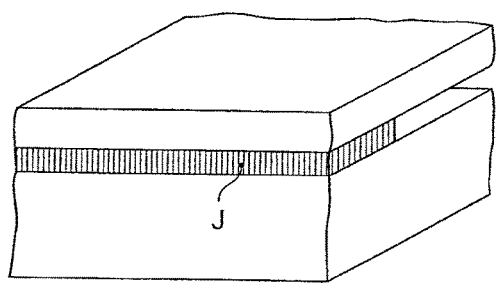
Figure 2:
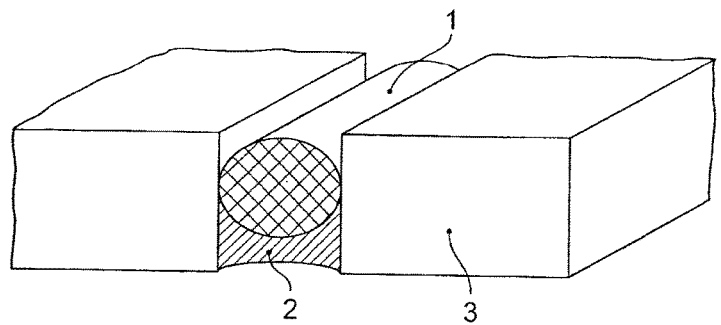

Current solutions for installation of the seals are illustrated in FIG. 2, wherein the reference 1 designates a roll, reference 2 a cordon of supporting glue, and the reference 3 refers to the concrete construction.

This process is currently widely used. It comprises several materials which meet all the requirements imposed on fire-beak expansion seals:

The roll is made of rock or glass wool, which provides good thermal insulation as well as a certain degree of fire-break.
Silicate glue is used to prevent slipping of the rock wool roll
Mastic is generally spread on the roll, which provides an adequate seal, and theoretically enables adaptation to construction expansions.

Other solutions exist which rely on a foam seal supported with mastic.

However, the existing solutions present certain disadvantages, in particular:

Alteration of the seal due to alternating compression and decompression phenomena. Indeed, it is not uncommon to see cordons falling or sagging with time. When this is the case, they no longer function as break-fire expansion seals.
The use of fiber products (rock or glass wool) which are insufficiently adapted to the expansion movements of buildings and which require individual protection equipment adapted to the installation of these types of products.
Deterioration of caulking seals due to the difficulty of insertion in an opening.
Need for the use of other materials for supporting the caulking seals in place, in particular the use of mastic or glue.

The purpose of the present invention is to supply a break-fire caulking or filling system, in particular for partition and/or expansion seals, which compensates for the disadvantages of the prior art by optimizing a non-fibrous compressible material, adapted to alternating compression, easy to install due to advantageous compressibility, with an extended life cycle, excluding the use of halogenated products (in contrast to conventional foam seals).

According to the present invention, the break-fire caulking or filling system displays fire resistance properties in compliance with effective regulations.

This system translates concretely as a preformed elastic foam element with variable section and length. It is compressible for installation purposes, and it also adapts to the building movements due to its composition, while retaining fire performance properties, in contrast to existing products. It is ready for use, and does not require any additional gluing material.

Unless otherwise stated, mass percentages are expressed in comparison to the total mass of the finished product (weight %).

Thus the present invention concerns a caulking or filling device with fire-break properties comprising an elastic material consisting of polyurethane foam. The foam is obtained by reacting:

At least one polyol with a molecular mass of 4000 to 7000 g/mol and an OH index of 20 to 40 (mg KOH/g) in a mixture of 0.3 to 1.5 weight % of water as an expansion agent, 0.1 to 2 weight % of a catalytic system of the amine type, and 0.3 to 0.5 weight % of a cell stabilization agent,
And an isocyanate in the form of a prepolymer or a quasi-prepolymer comprising 5 to 25% free NCO functions ("NCO content" compared to isocyanate weight) and, in that, said material comprises at least 50 weight % of fire retardant agents.

The polyol may be combined with at least one of the following reaction products: a polyol with a molecular mass of 2000 to 5000 g/mol, and an OH index of 20 to 50, a polyol with an OH index of approximately 28.5, an organic oil.

Flame retardant agents may comprise: —a solid carbonization agent of the type expanded graphite, a reactive carbonization agent, a mineral vitrification agent.

The solid carbonization agent may comprise at least two agents with different granulometric grade.

The organic oil may be incorporated at 5 to 50 weight % compared to the total weight of the polyol.

One of the following additives may be added as a stabilizer of the graphite crust: 2 to 5 weight % of a fibrous material with a grade of 75 to 250 µm, at most 2 weight % of TiO2.

The isocyanate may present 5 to 15% free NCO functions ("NCO content" compared to the weight of the isocyanate).

The invention also concerns use of the invention device for the manufacture of a long rod with a constant section that may be inserted in an opening, as a caulking and/or expansion seal.

The invention also concerns use of the invention device for the manufacture of an elastic filling seal, which also has break-fire properties.

Figure 3A:
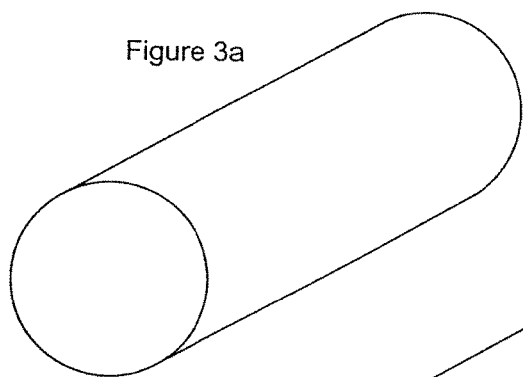
Figure 3B:
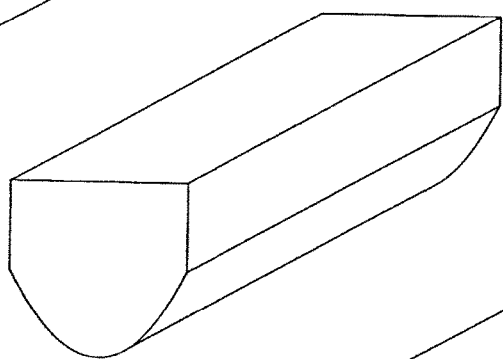
Figure 3C:
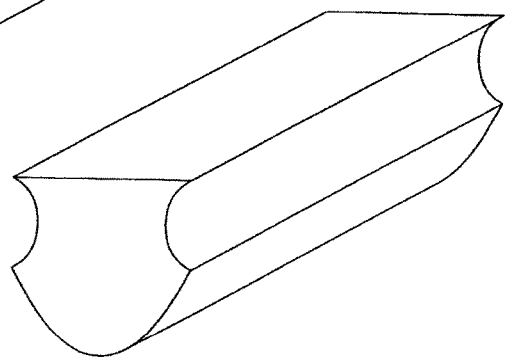
Figure 4:
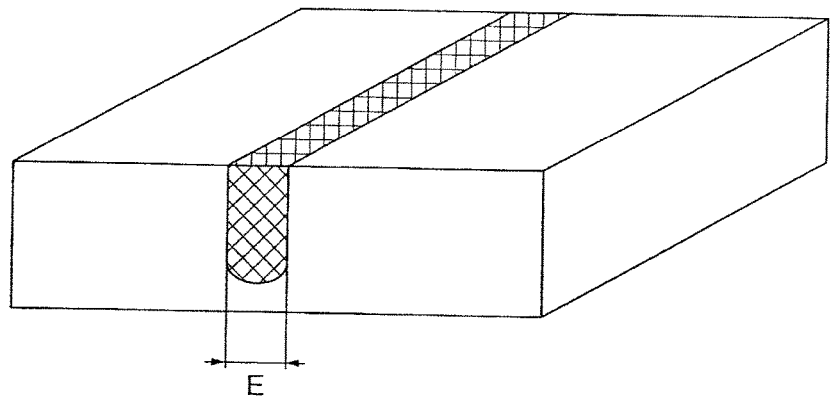

The present invention shall be better understood, and the advantages shall appear more clearly, in light of the following description with examples of embodiments of the invention, in no way limited, and illustrated by the following appended figures, among which:

FIGS. 1a-1e show examples of caulking seal applications.
FIG. 2 shows a caulking means according to the prior art.
FIGS. 3a, 3b, and 3c show seal forms according to the invention.
FIG. 4 shows a diagram of the implementation seal.
FIGS. 5a to 5d show the mechanical properties of various formulations of the seal material according to the invention.

The first goal of the invention is to create at least two functions:

To ensure thermal insulation and a seal resistance to hot gases in case of a fire.

To function as a partition seal in a construction.

The combination of these two functions is not provided by existing products that are currently used.

The invention seal presents the following advantages:

Installs easily without the use of specific tools, accessories or additive products Adapts to distortions of the supporting structure (variations of the width of the opening)

Adapts to alternating thermal expansion of the support structure

Stays in place over time

Easily stored and handled in rolls

Resistant to cycles of freeze and thaw

Resistant to contact with hydrocarbons

Seal resistance to water

The caulking device consists of a seal, essentially comprising a polyurethane-based polymer material. Polyurethane is obtained via reaction of a polyol (presence of OH functions) and an isocyanate (presence of NCO functions). There is great diversity of available raw materials, and thus there is great variety in the foam that is obtained with very different chemical and mechanical properties.

The present invention is based on an optimized selection of raw materials in view of obtaining the required properties:

A polyol (triol) (polyol 1), preferably a polyether with a molecular mass of 4000 to 7000 g/mol and an OH index (mg KOH/g) of 20 to 40, thus yielding very good resilience. Indeed, the rigidity of the polyurethane depends on the polyol chains (and thus on molecular mass) between polyurethane bridges. For example, to create rigid systems, short chained polyols are used with a molecular mass that is less than 2000 g/mol.

The polyol below may be used alone, and also in combination with other polyols:

A polyol (triol) presenting a molecular weight of 2000 to 5000 g/mol, and an OH index of 30 to 50 (polyol 2)

A polyol (diol) with an OH index of 28.5 (polyol 3)

"Extender" products (oil 4) of the type organic oil (hemp, castor bean, palm) may be incorporated at 5 to 40 weight % compared to the total weight of the polyol, that is 2 to 13% of the total weight, in substitution of at least one polyol. We observed that under said proportions, the oils yield adequate flexibility.

An isocyanate in the form or prepolymers or quasi prepolymers, of the type MDI or TDI, which were pre-reacted with polyols, and which comprise 5 to 25% free NCO functions compared to the weight of the isocyanate (with the isocyanate preferably representing approximately 10 to 25 weight % of the final product). Depending on the polyols used, selection of the isocyanate is adapted: an isocyanate 1 may be used with 15 to 25% of free NCO functions compared to the weight of the isocyanate, or an isocyanate 2 with 5 to 15% of free NCO functions compared to the weight of the isocyanate.

At least one catalyzer of the type tertiary amines which promote cell opening during the expansion reaction, with a mass percent of 0.1 to 2%.

At least one cell stabilization and homogenization agent (for example silicon), with a mass percent of 0.3 to 0.5%.

At least one expansion agent: preferably, water in a quantity of 0.3 to 1.5 weight %. The best results are obtained with addition of 0.6 to 0.9 weight % of water (as a fire resistance/flexibility compromise). However, in addition to water (as a co-bulking agent), a non-reactive expansion agent may be used of the type methylal, of 1.5 to weight %, to limit the skin effect that forms on the surface of the product (in cases of free expansion). In this case, an amine catalyzer will be needed (of the type 2-dimethyl-aminoethyl-ether) diluted or not, in view of increasing exothermia of the reaction to obtain methylal gas (boiling point at T=42.3° C.).

Flame retardants comprising:

at least a solid carbonization agent, consisting of a combination expanded graphite or equivalent (vermiculite, . . . ) at varying grades (of 150 to 300 μm) with a mass of 19 to 25%. The addition of this carbonization agent is essential for obtaining important fire resistance. The expanded graphite grade at 300 μm is preferably used because it results in better performance with fire than a finer grade, and it does not deteriorate as much the mechanical properties of the alveolar product that is obtained. A finer grade (150 μm) may be used in addition (at 4 to 10 weight %, preferably at 5 weight %) in view of obtaining a carbonization layer that is more cohesive (dispersion of particles).

At least a reactive carbonization agent comprising a phosphate, in particular tricresyl phosphate or equivalent, with a 15 to 20% mass.

Indeed, the latter will have two roles: plastifying and fire-retardant which explains its high percentage within the matrix. In the category of reactive agents, we do not use ammonium polyphosphate. Indeed, this additive interferes with foam formation and prevents meeting the required functionalities.

At least a mineral agent of the type glass powder or mica, zinc borate to create a vitrified layer during the rise in temperature, and to stabilize graphite expansion. Indeed, zinc borate, or preferably zinc stannate, which is environmentally safe, deteriorates at 130 to 270° C. while releasing water. The latter softens at around 350° C., and liquefies at above 500° C. to form a vitreous layer. For the case of polymers containing oxygen, the presence of boric or stannic acid creates dehydration which results in the formation of a carbonization layer. These layers provide a thermal screen and protect the polymer while also enabling to reduce smoke.

The glass powder functions at the highest temperature (900° C.). It may be substituted with, for example, mica, fillite, or montmorillonite.

Then, a maximum of 6 and 10 weight % of each of the agents is added. Indeed, the use of a larger quantity results in a loss of the mechanical properties of the foam, as well as a decrease in the fire retardant properties (antagonist performances between graphite and borate/stannate).

Fibers may be used to stabilize the graphite crust (for example cellulose fibers) with a grade of 75 to 250 μm, and at 2 to 5 weight %.

Addition of a low percentage of $TiO_2$, less than 2 weight % as a crust stabilizer.

The total percentage of flame retardant additives is more than 48 weight %, which results in adequate fire performance compared to the basic properties of the polymer. This level is high compared to conventional products. For the present invention, the required properties are obtained in particular due to a combination of resins, addition of an extender, and adequate distribution of all loads.

Below, examples of several formulations enable to obtain the anticipated properties for the invention product: (the percentages indicate masses expressed in comparison to the mass of the total finished product: weight %).

| Products | F-No. 1 | F-No. 2 | F-No. 3 | F-No. 4 | F-No. 5 | F-No. 6 |
|---|---|---|---|---|---|---|
| Polyol 1 | 31.02 | 13.5 | 20 | 34.06 | 34.06 | 22.46 |
| Polyol 2 | | 13.5 | | | | |
| Polyol 3 | | 3.6 | | | | |
| Oil 4 | | | 12 | | | |
| Catalyzer | 0.2 | 0.2 | 0.2 | 0.2 | 0.2 | 0.2 |
| Water | 0.9 | 0.9 | 0.9 | 0.9 | 0.9 | 1 |
| Silicon | 0.3 | 0.3 | 0.3 | 0.3 | 0.3 | 0.3 |
| Isocyanate 1 | 15 | 14 | 14 | 16 | 16 | |
| Isocyanate 2 | | | | | | 25.5 |
| Graphite 300 | 22.46 | 23.46 | 23.46 | 20 | 20 | 20 |
| Tricresyl phosphate | 17.2 | 17.2 | 17.2 | 15.2 | 15.2 | 17.2 |
| Zinc borate | 7. | 7.25 | 7.25 | 9.42 | 7.42 | 7.25 |
| Quartz | 6 | 6.17 | 6.17 | | | |
| Silicate | | | | | 6 | 6.17 |
| Fibers | | | | 2 | | |
| TiO2 | | | | 2 | | |

Elastic Recovery Test

Compressed elastic recovery testing of a material consists in letting the material regain its size following distortion due to compression (crushing). This test characterizes the capacity of the material to retain contact with its support structure after being crushed. In the present case, elastic recovery over time is determined following many cycles of compression/release.

Elastic recovery testing is performed between two parallel plates with a measurement of the distance between both plates and of the compression force. The insertion of the seal always occurs with slight initial compression since the opening in which the seal is inserted is always smaller so that it may stay in place without adhesives.

A 100% elastic recovery corresponds to the case where the seal, following crushing and release, retains sufficient viscoelastic properties to exert a compression force on the supporting structure. The seal material thus retains constant contact with the supporting structure, and this fulfills sealing and support functions.

An elastic recovery that is less than 100% corresponds to the case where there is a loss of contact between the seal and the supporting structure after a given distortion. This performance may be due to inadequate viscoelastic properties of the material or to deterioration of the material.

Figure 5A:
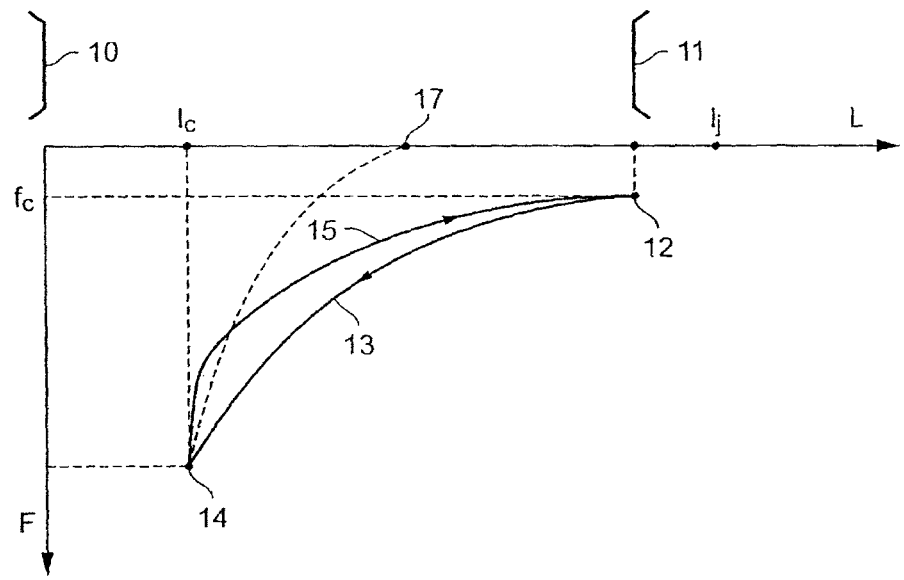

FIG. 5a shows the type of graph that illustrates the response recovery of a material. L measures the distance between crushing plates, referenced as 10 and 11 in the figures. The vertical axis indicates the force F that is applied to the plates. The reference 1j provides the original width of the invention seal. Point 12 indicates the seal inserted via compression between the plates: the width is decreased and it is slightly compressed at an Fc value. During compression of the plate 11, the state of the seal follows the curve 13 up to point 14 where the seal has a width of 1c. During release of plate 11, the state of the seal follows curve 15 with a recovery point that is close to point 12, the point of origin. In this case, elastic recovery equals 100%. If the state of the seal follows curve 16, with a recovery close to point 17, then elastic recovery is less than 100%, since the width of the seal is less than the starting point width.

Figure 5B:
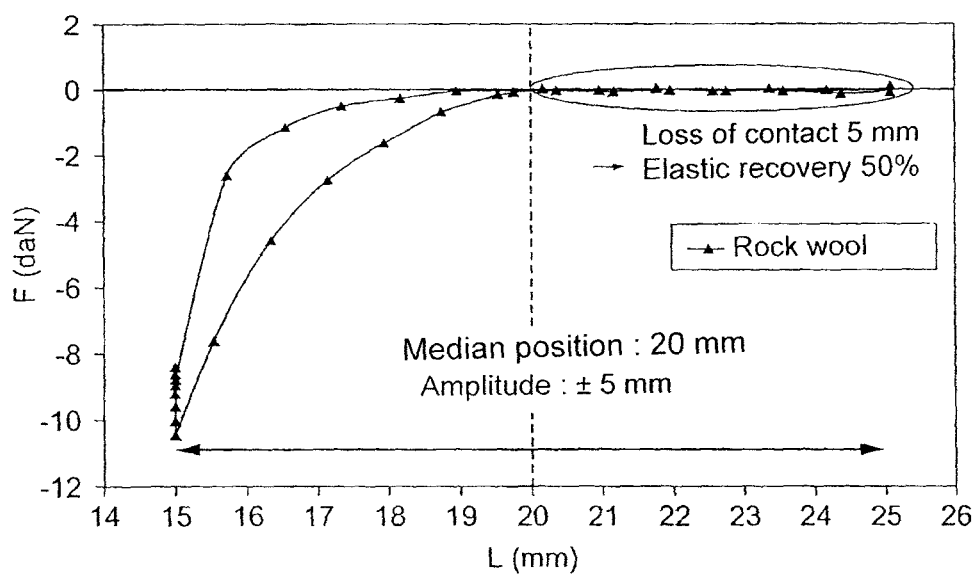

FIG. 5b illustrates the elastic recovery capacity of a rock wool seal, with a width of 25 mm, which clearly displays no efficient elastic recovery at 50%.

Figure 5C:
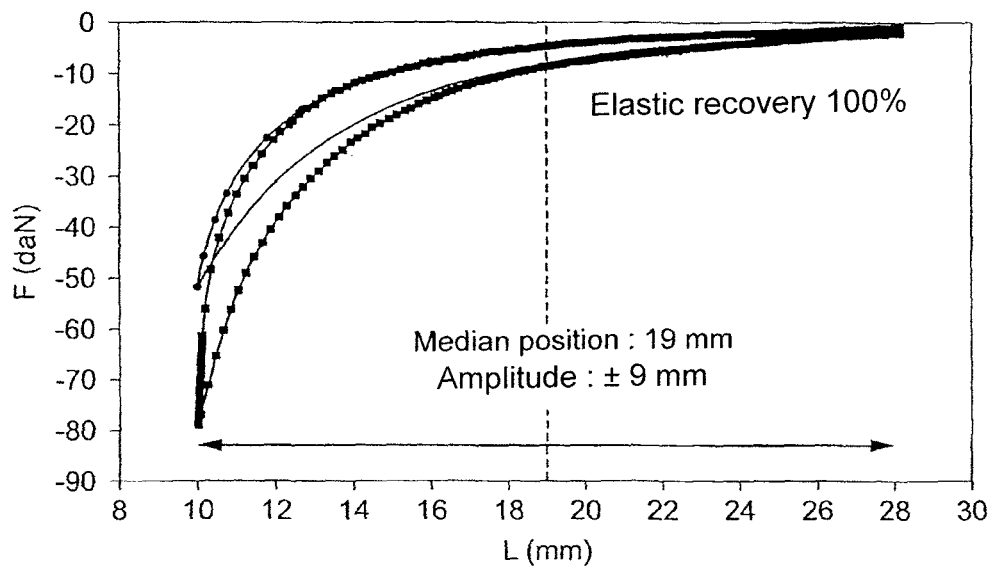

FIG. 5c shows elastic recovery testing on 28 mm seals made of a material according to formulation 1 and according to formulation 6. The tests were performed for 10 cycles, and we observed an equivalent elastic recovery, equal to 100% for both seal samples, despite the high fire breaking loads (more than 50%).

Durability of Elastic Recovery

If it is interesting to determine elastic recovery of a seal at a given time, it is also important to determine elastic recovery development across time. For this purpose, we submitted a single sample seal to cycles of distortion.

Figure 5D:
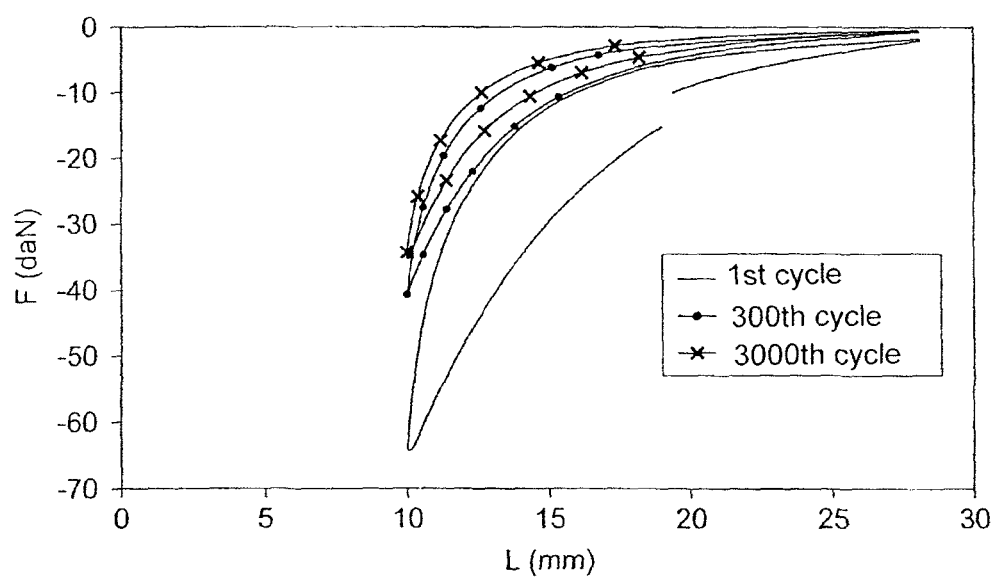

The development of elastic recovery across time is better highlighted in FIG. 5d. On this Figure we report elastic recovery curves for the first cycle, for cycle 300, and for of the material according to formula No. 1. We observed that after 3000 cycles, elastic recovery was still equal to 100%.

Fire Testing

Seal samples display the same geometrical shape and measure 200 mm in length, 50 mm in height, and 37 mm in width.

The samples were placed in a non-combustible support structure of the same dimension (thus the seal was not compressed) and were tested widthwise.

A Bunsen burner was placed 5 cm from the product.

The product was torched for 5 minutes.

Then, we measured the height of the seal that was not burnt by the flame.

The height of the seal gives an objective indication of the quality of the flame resistant shield used. The higher the height, the more the system functioned as a flame resistant shield.

TABLE A

| | Height of the seal not burnt | % of the seal burnt |
|---|---|---|
| Formula 1 | 3 cm | 14% |
| Formula 2 | 3.5 cm | 5% |
| Formula 3 | 3.5 cm | 5% |

Additives of the type fibers, silicate and TiO2, promote fire resistance of the material. The percentage of burnt seal was clearly lower when using these types of additives.

With Formula No. 1, the total polymer system was 47.42 weight %. This polymer part consisted of a single polyol with a molecular weight of 6000 g/mol, and an OH index of approximately 26. The 47.42% polymer additive results in a 100% elastic recovery of the material with adequate fire resistance performance as shown in the tests results reported below.

With Formula No. 2, the total polymer system was 46 weight %. This polymer part consisted of several polyols: a polyol with a molecular weight of 6000 g/mol, and an OH index of approximately 26, a polyol (triol) with a molecular weight of 2000 to 5000 g/mol, and an OH index of 30 to 50 (polyol 2) and a polyol (diol) with an OH/index of 28.5 (polyol 3). The advantage of this mixture is that it reinforces the mechanical properties of the product.

In Formula No. 3, we used oil in combination to the polyol with a molecular weight of 6000 g/mol, and with an OH index of approximately 26. Oil brings an additional flexibility to the product. In this formulation, the total polymer system reached 47.4 weight %.

With Formulas No. 4 and No. 5, the total polymer system reached 51.46 weight %. Use of fibers and of tiO2 in Formula No. 1, and silicate in Formula No. 5, resulted in increased fire resistance performances of the product as indicated in the above Table A.

In Formula No. 6, the total polymer system reached 49.46 weight %. With this formula, we used isocyanate 2 at 25.5 weight %. The use this isocyanate results in better resistance to tear than the use of isocyanate 1.

Process and Manufacture

In general we proceeded with preliminary adjunction of the various additives in the polyol.

Then, the mixture polyol/additives was reacted with isocyanate, either with manual mixing or with high or low pressure machine stirring. The mixture was poured in a mold designed for this purpose. It was also possible to proceed via continuous injection. The mixture was then poured continuously via conveyor belt.

The molding system must allow for free expansion of the foam, but it is also a mold that is closed after the mixture is poured so as to avoid all skin forming phenomena.

Examples of potential seal shapes are illustrated in FIGS. 3a, 3b and 3c.

The section of the seal in FIG. 3a (circle) measures 804.2 mm$^2$.

The section of the seal in FIG. 3b measures 867.5 mm$^2$.

The section of the seal in FIG. 3c measures 887.5 mm$^2$.

The average length of the seal roll may be 10 meters. For cases of joining between two rolls, the seal ends may be placed end-to-end without any particular cut-out, so that they may be inserted compressed in view of retaining a perfect seal.

FIG. 4 shows an insertion diagram inside an opening with a width E.

A series of break-fire seals may be produced in response to varying conditions. The openings or slots, for the most part are 10 to 100 mm. For this particular application, one or several specific seals can be manufactured for each of the opening widths:

| Opening width (mm) | Possible dimensions of the caulking seal (width × thickness) (mm) |
|---|---|
| 10 | 20 × 30 |
| 20 | 35.8 × 40/50 |
| 30 | 48.8 × 50 |
| 40 | 65 × 55 |
| 50 | 81.3 × 60 |
| 60 | 97.5 × 65 |
| 70 | 120 × 70 |
| 80 | 140 × 80 |
| 100 | 160 × 90 |

The present invention is not limited to break-fire seals, it also concerns all applications which may advantageously be implemented using the insulation material under dimensional constraints of compression or elongation requiring high elastic recovery for a large number of cycles, adequate thermal insulation (thermal conductivity of 29 mW·m-1K-1), adequate fire resistance performance, and eventually acoustic attenuation (average acoustic performance factor K of 60 to 90%).

These applications may consist of: panel, armchair or mattress filling; pipe insulation, smoke curtains, flexible thermal screens, or fire-break flexible curtains.

Examples of Seal Application and Performance

The reaction mixture was poured in molds with a section measuring 48*30 mm; 55*43 mm, 74*61 and 94*83. This resulted in foam seal lengths of varying sizes.

The seals were inserted manually and compressed between concrete slabs. Seal joining was performed with straight cuts without overlap.

The seals were then tested according to the new European standard for fire resistance testing EN1366-4.

The seal were then submitted and exposed to flames for 240 minutes. Exposure conditions were the following: products were submitted to the temperature/time curve T=345 log(10)(8t+1)+20

Prior to testing, the product was submitted to decompression with the concrete slabs pulled apart 20% from their original width.

The products thus tested with the invention formulation enabled to obtain thermal insulation for 240 minutes (elevation less than 180° C. for the non-exposed side), and seal resistance to hot gases and smoke during 240 minutes (no inflammation when cotton was placed near the non-exposed side).

The invention claimed is:

1. Caulking or filling device with fire-break properties comprising an elastic material comprising polyurethane foam, characterized in that said polyurethane foam is obtained by reacting:
   at least one polyol with a molecular mass of 4000 to 7000 g/mol and an OH index of 20 to 40 mg KOH/g in a mixture of 0.3 to 1.5 weight % of water as an expansion agent, 0.1 to 2 weight % of a catalytic system of the amine type, and at least one cell stabilization agent, wherein a total amount of cell stabilization agent compared to the weight of said elastic material is in a range of 0.3 to 0.5 weight %,
   and an isocyanate in the form of a prepolymer or a quasi-prepolymer comprising 5 to 25% free NCO functions based on the weight of said isocyanate,
   and, in that, said elastic material comprises at least 50 weight % of fire retardant agents.

2. Device according to claim 1, wherein said at least one polyol is combined with at least one material selected from the group consisting of a polyol with a molecular mass of 2000 to 5000 g/mol and an OH index of 20 to 50, a polyol with an OH index of approximately 28.5, and an organic oil.

3. Caulking or filling device with fire-break properties comprising an elastic material comprising polyurethane foam, characterized in that said polyurethane foam is obtained by reacting:
   at least one polyol with a molecular mass of 4000 to 7000 g/mol and an OH index of 20 to 40 mg KOH/g in a mixture of 0.3 to 1.5 weight % of water as an expansion agent, 0.1 to 2 weight % of a catalytic system of the amine type, and at least one cell stabilization agent, wherein a total amount of cell stabilization agent compared to the weight of said elastic material is in a range of 0.3 to 0.5 weight %,
   and an isocyanate in the form of a prepolymer or a quasi-prepolymer comprising 5 to 25% free NCO functions based on the weight of said isocyanate,
   and, in that, said elastic material comprises at least 50 weight % of fire retardant agents comprising a solid carbonization agent of the type selected from the group consisting of graphite, a reactive carbonization agent, and a mineral vitrification agent.

4. Device according to claim 3, wherein said solid carbonization agent comprises at least two agents with different granulometric grades.

5. Device according to claim 3, wherein said solid carbonization agent comprises at least a graphite having a 150 to 300 μm grade.

6. Device according to claim 1, wherein the at least one polyol is mixed with 0.6 to 0.9 weight % of water as an expansion agent.

7. Device according to claim 2, wherein said organic oil is incorporated at 5 to 40 weight % compared to the total weight of the at least one polyol.

8. Device according to claim 1, wherein at least one of the following additives is added as a stabilizer of a graphite crust: 2 to 5 weight % of fibrous material with a grade of 75 to 250 μm, and at most 2 weight % of $TiO_2$.

9. Device according to claim 1, wherein said isocyanate has 5 to 15% free NCO functions based on the weight of said isocyanate.

10. A long rod with an even section for the purpose of introducing it in an opening, as a caulking and/or expansion seal, the long rod being made of the caulking or filling device according to claim 1.

11. A method for providing an elastic filling having fire-break properties between slabs or shells, comprising:
    providing adjacent slabs and/or shells having a gap therebetween; and then
    inserting the caulking or filling device according to claim 1 into the gap between adjacent slabs and/or shells.

12. Device according to claim 3, wherein said at least one polyol is combined with at least one material selected from the group consisting of a polyol with a molecular mass of 2000 to 5000 g/mol and an OH index of 20 to 50, a polyol with an OH index of approximately 28.5, and an organic oil.

13. Device according to claim 12, wherein said organic oil is incorporated at 5 to 40 weight % compared to the total weight of the polyol.

14. Device according to claim 3, wherein said at least one polyol is mixed with 0.6 to 0.9 weight % of water as an expansion agent.

15. Device according to claim 3, wherein at least one of the following additives is added as a stabilizer of a graphite crust: 2 to 5 weight % of fibrous material with a grade of 75 to 250 μm, and at most 2 weight % of $TiO_2$.

16. Device according to claim 3, wherein said isocyanate has 5 to 15% free NCO functions based on the weight of said isocyanate.

17. A long rod with an even section for the purpose of introducing it in an opening, as a caulking and/or expansion seal, the long rod being made of the caulking or filling device according to claim 3.

18. A method for providing an elastic filling and with fire-break properties between slabs or shells, comprising:
    providing adjacent slabs and/or shells having a gap therebetween; and then
    inserting the caulking or filling device according to claim 3 into the gap between adjacent slabs and/or shells.

19. The method according to claim 18, wherein the gap between adjacent slabs and/or shells is smaller than a width of the caulking or filling device.

20. The method according to claim 11, wherein the gap between adjacent slabs and/or shells is smaller than a width of the caulking or filling device.

* * * * *